Aug. 22, 1939.  T. A. PETERMAN  2,170,064
WHEEL SUSPENSION
Filed Aug. 3, 1937  2 Sheets-Sheet 1
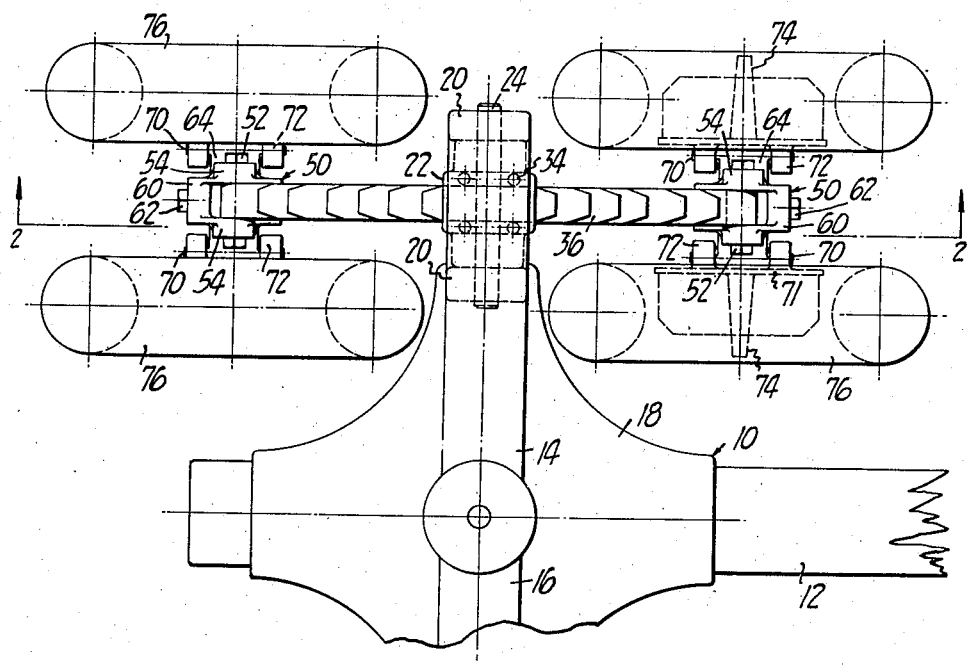
FIG_1_
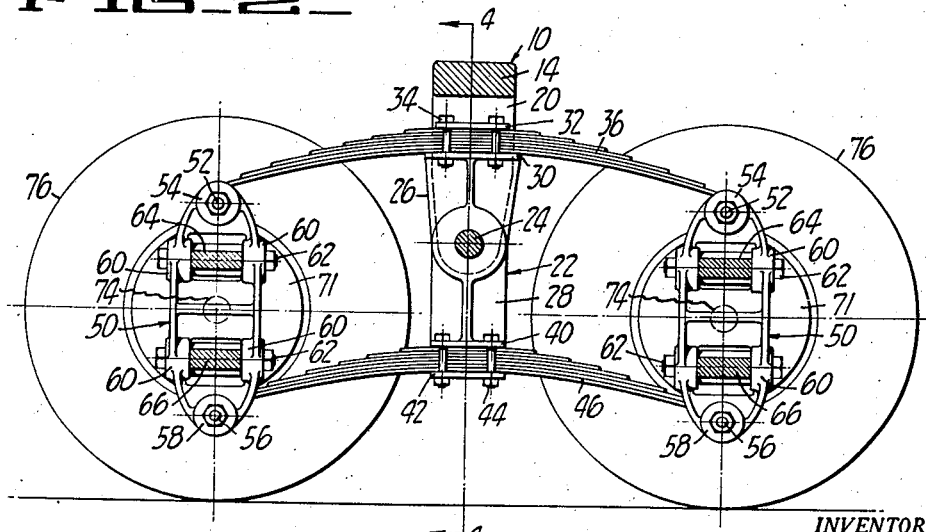
FIG_2_
INVENTOR.
Theodore A. Peterman
BY
ATTORNEY Aug. 22, 1939.  T. A. PETERMAN  2,170,064
WHEEL SUSPENSION
Filed Aug. 3, 1937  2 Sheets-Sheet 2
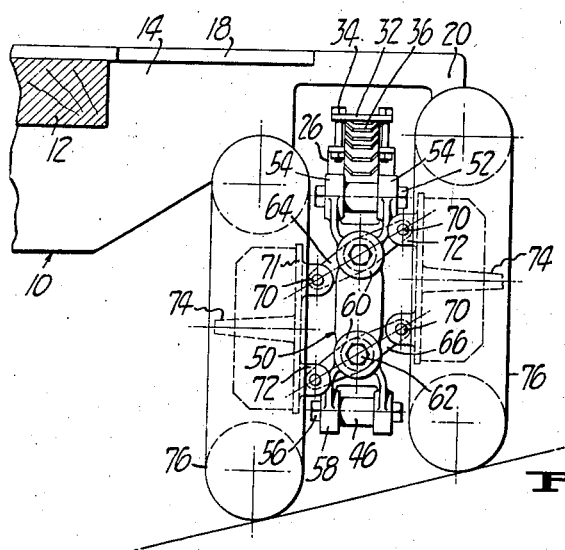
FIG_3_
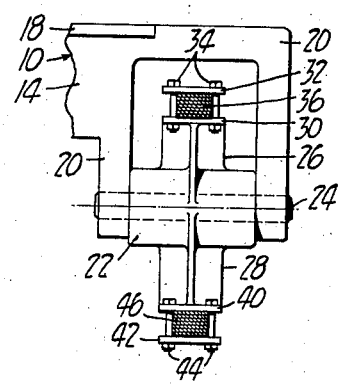
FIG_4_
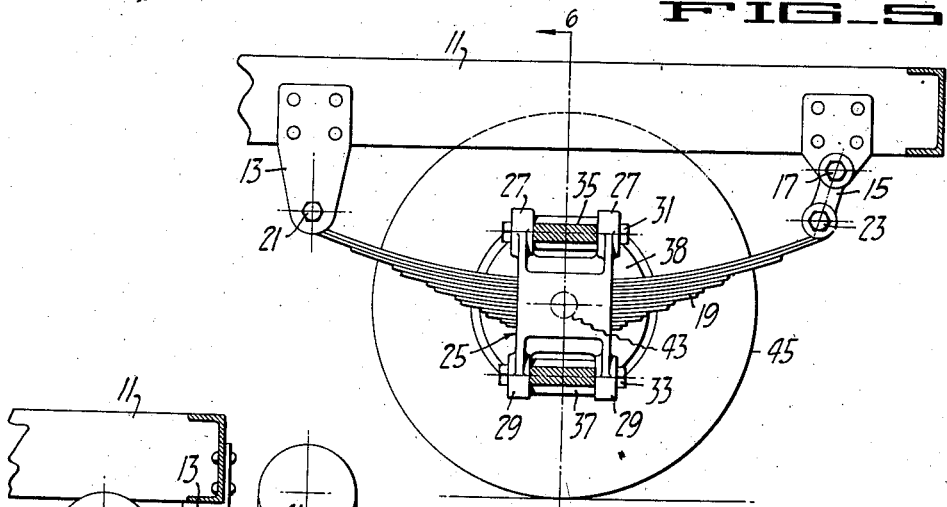
FIG_5_
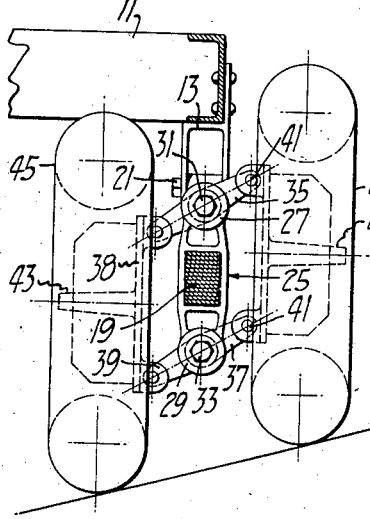
FIG_6_
INVENTOR.
Theodore A. Peterman
BY
ATTORNEY Patented Aug. 22, 1939

2,170,064

UNITED STATES PATENT OFFICE 2,170,064

WHEEL SUSPENSION

Theodore A. Peterman, Tacoma, Wash.

Application August 3, 1937, Serial No. 157,125

4 Claims. (Cl. 280—124)

My invention relates to vehicles of the multiple wheel type, especially adapted to traverse uneven terrain by the provision of independent suspensions for the several wheels, and more particularly to spring wheel suspensions for vehicles of the above type.

The principal object of my invention is to provide a spring wheel suspension for vehicles of the multiple wheel type in which the wheels are capable of relative movement in order to equalize the load upon them.

Another object of my invention is to provide a wheel suspension in which a relatively small movement of the load will be produced when any one wheel encounters an obstacle and in which such movement as is transmitted to the load will be cushioned by spring elements in the wheel suspension.

The novel features characteristic of the invention are set forth with particularity in the appended claims. My invention itself, however, together with additional objects and advantages thereof, will best be understood from the following description of specific embodiments thereof when read in connection with the accompanying drawings in which:

Figure 1 is a plan view of a four wheel suspension for a vehicle constructed in accordance with my invention, a similar suspension on the opposite side of the vehicle being broken away to reduce the size of the figure.

Figure 2 is a vertical sectional view taken on the line 2—2 of Figure 1.

Figure 3 is a view in end elevation of the suspension of Figure 1.

Figure 4 is a detail view of the spring holder of the suspension of Figure 1.

Figure 5 is a longitudinal vertical sectional view of a two-wheel suspension for a vehicle constructed in accordance with my invention.

Figure 6 is a transverse vertical sectional view of the structure disclosed in Figure 5, a similar suspension at the opposite side of the vehicle being broken away to reduce the size of the vehicle.

In its preferred form the wheel suspension of my invention includes a main frame upon which is suspended a resilient member carrying centrally pivoted equalizer links, corresponding ends of which are connected by hangers from each of which projects a spindle for a ground engaging wheel, the arrangement being such that each of the wheels may move vertically with respect to the resilient member as they engage irregularities in the terrain traversed, and also such that the engagement of such irregularities may effect flexure of the resilient member to cushion the movement transmitted to the main frame.

In the embodiment illustrated in Figures 1 to 4, the wheel suspension of my invention is mounted on a main frame 10 which includes a reach rod 12 and outriggers 14 and 16 extending transversely of the reach rod 12 and heavily braced with respect thereto by a bolster frame 18 embracing the reach rod and the outriggers, and spanning diagonally between the walls of these members to provide an extremely rigid main frame.

Each of the outriggers 14 terminates in a pair of depending arms 20 between the lower ends of which a spring support 22 is mounted for pivotal movement on a pin 24 retained in the arms 20 and extending through the hub of the spring support 22.

The spring support 22 (Figures 2 and 4) comprises upper and lower arms 26 and 28, respectively. The upper arm 26 terminates in a plate 30 to which is clamped, by means of plate 32 and bolts 34, a resilient member, preferably in the form of a semi-elliptical spring 36. The lower end 28 of the spring support 22 terminates in a plate 40, to which is clamped by means of plate 42 and bolts 44 a second resilient member, preferably in the form of a second semi-elliptical spring 46.

The adjacent ends of springs 36 and 46 are connected together, as shown in Figure 2, by members 50 which act as spring yokes and rocker link supports, each being provided with an upper shackle pin 52 extending between spaced ears 54 on the member 50, to which pin the upper spring 36 is pivotally connected, and a lower shackle pin 56 extending between spaced ears 58 on the member 50, to which pin one end of the lower spring 46 is pivotally connected.

The ground engaging wheels are suspended from the spring yoke members 50 by parallel linkages permitting them to move vertically with respect to each other. For this purpose each yoke 50 is provided with two pairs of spaced ears 60 supporting pivot pins 62, upon which are pivotally mounted an upper rocker link 64 and a lower rocker link 66, respectively. To complete the parallel linkage, the corresponding ends of the upper and lower rocker links 64 and 66 are pivotally connected by pins 70 (Figure 3) to hangers 71, which may conveniently take the form of standard heavy metal brake plates, provided with ears 72 to receive the upper and lower pin 70, respectively.

A spindle 74 projects from each of the hangers 71 and supports the road wheels 76, each of which is capable, by virtue of the above-described parallel linkage arrangement, of moving vertically with respect to the other when it encounters an obstacle or depression in the terrain being traversed.

It will be apparent from the foregoing that the arrangement provided by my invention provides a construction in which the raising or lowering of one wheel, due to the encountering of a depression or obstacle in the roadway, will result in only one-quarter as much vertical movement of the load, since the rocker links 64 and 66 will act as levers of the second class with the load disposed midway between the fulcrums and the moving ends, thus decreasing the movement of the load by one-half while the spring suspension of the two yoke assemblies 50 pivotally mounted at 24 will act as a second and resilient lever of the second class, with the load disposed at the pivot 24 midway between the fulcrum and the moving end, thus decreasing the movement of the load one-half again.

In addition to this decrease of the movement of the load, such movement will, in the construction which has been described, be a gradual one no matter how sudden the vertical movement of the wheel, since the interposed springs 36 and 46 act not only as a lever system to reduce the amount of movement of the load, but also as a cushioning medium in effecting such movement.

In the embodiment shown in Figures 5 and 6, the wheel suspension of my invention includes a main frame 11 carrying a fixed spring shackle 13 and a floating spring shackle 15 pivotally mounted on the main frame 11 at 17. A resilient member, preferably in the form of a semi-elliptical spring 19, is pivotally attached to the shackles 13 and 15 at 21 and 23 respectively, and secured to the spring 19, preferably centrally thereof, is a spring holder and rocker link yoke 25, which serves as a retainer for the leaves of the spring 19 and as a pivotal support for the rocker links.

The upper and lower portions of the rocker link yoke 25 are provided with pairs of spaced ears 27 and 29, respectively, in which pins 31 and 33 are retained to provide a pivotal mounting for rocker links 35 and 37, respectively, this arrangement being such that the rocker links 35 and 37 are pivoted for rocking movement in a plane transverse to the plane in which the spring 19 extends.

The corresponding ends of rocker links 35 and 37 are interconnected at each side of the spring 19 by hangers 38, which can conveniently take the form of standard metal brake plates, provided with ears 39 adapted to receive pins 41 passing through the ends of rocker links 35 and 37 to pivotally connect them to the hangers 38.

A spindle 43 projects from each of the hangers 38 to receive the ground engaging wheels 45 so that each of the wheels may move vertically with respect to the other by means of the parallel linkage suspension through which they are connected to the rocker link yoke 25, said parallel linkage suspension comprising the rocker links 35 and 37 and hanger 38.

With the wheel suspension described above it will be apparent that when one of the wheels 45 encounters an inequality in the terrain not met by the other, it may rise or fall with respect thereto. However, the vertical movement imparted to the main frame 11 by said rising or falling of one of the wheels 45 will be only half of the amount through which the wheel moves vertically because the rocker links 35 and 37 will, in such operation, act as levers of the second class in which the weight is disposed equidistantly between the fulcrum and the moving end. Furthermore, due to the spring suspension between the rocker link yoke 25 and the main frame 11, such movement as is imparted to the main frame will be gradual no matter how sudden the movement imparted to either or both of the wheels 45.

It will therefore be apparent that my invention provides a wheel suspension in which the movement imparted to the frame by vertical movement of one of the wheels thereof is not only substantially decreased but is adequately cushioned.

I claim:

1. A vehicle wheel suspension comprising a frame element, a vertically disposed spring support member pivotally mounted on said frame element and having arms extending oppositely from said pivotal mounting, a plurality of longitudinally extending leaf springs secured centrally thereof to opposite arms of said spring support member, wheel carrying members pivotally connected to the free end of said springs and connecting the same, and a plurality of road wheels pivotally mounted on each of said wheel carrying members by means constituting a parallel linkage suspension.

2. A vehicle wheel suspension comprising a frame element, a vertically disposed spring support member pivotally mounted on said frame element and having arms extending oppositely from said pivotal mounting, a plurality of longitudinally extending leaf springs secured centrally thereof to opposite arms of said spring support member, wheel carrying members pivotally connected to the free end of said springs and connecting the same, a pair of suspension links pivotally mounted on each of said wheel carrying members, wheel supports pivotally connected to said suspension links, and road wheels rotatably mounted on said wheel supports.

3. A vehicle wheel suspension comprising a frame element, a spring support member pivotally mounted on said frame element, a plurality of longitudinally extending leaf springs secured centrally thereof to said spring support member, wheel carrying members connecting the free ends of said springs, and a plurality of road wheels pivotally mounted on each of said wheel carrying members by means constituting a parallel linkage suspension.

4. A vehicle wheel suspension comprising a frame element, a spring support member pivotally mounted on said frame element, a plurality of longitudinally extending leaf springs secured centrally thereof to said spring support member, wheel carrying members connecting the free ends of said springs, a pair of suspension links pivotally mounted on each of said wheel carrying members, wheel supports pivotally connected to said suspension links, and road wheels rotatably mounted on said wheel supports.

THEODORE A. PETERMAN.